US012583372B2

(12) United States Patent
    Kawamura et al.

(10) Patent No.: US 12,583,372 B2
(45) Date of Patent: Mar. 24, 2026

(54) POSTURE SUPPORT DEVICE

(71) Applicant: TOYOTA JIDOSHA KABUSHIKI KAISHA, Aichi-ken (JP)

(72) Inventors: Yoshiyuki Kawamura, Seto (JP); Makoto Omura, Toyota (JP); Keita Ito, Aichi-ken (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 164 days.

(21) Appl. No.: 18/465,985

(22) Filed: Sep. 13, 2023

(65) Prior Publication Data

US 2024/0092240 A1 Mar. 21, 2024

(30) Foreign Application Priority Data

Sep. 16, 2022 (JP) ................................. 2022-147681
May 16, 2023 (JP) ................................. 2023-080751

(51) Int. Cl.
    *B60N 2/64* (2006.01)
    *A47C 7/42* (2006.01)

(52) U.S. Cl.
    CPC .............. *B60N 2/643* (2013.01); *A47C 7/425* (2013.01)

(58) Field of Classification Search
    CPC ......... A47C 7/425; B60N 2/64; B60N 2/7005
    See application file for complete search history.

(56) References Cited

U.S. PATENT DOCUMENTS

| | | | | |
|---|---|---|---|---|
| 3,542,421 A | * | 11/1970 | Ambrose ............... | A47C 7/425 297/230.12 |
| 4,362,334 A | * | 12/1982 | Ross ...................... | A47C 7/405 297/230.12 |
| 4,824,169 A | * | 4/1989 | Jarrell ..................... | A61G 5/00 297/452.32 |
| 4,862,536 A | * | 9/1989 | Pruit ........................ | A47C 7/46 297/230.14 |
| 6,132,004 A | * | 10/2000 | Carlino .................. | A47C 7/425 297/452.48 |
| 7,757,321 B2 | * | 7/2010 | Calvert .................. | A47C 7/021 5/652 |
| 8,740,307 B1 | * | 6/2014 | Thomas ................. | B60N 2/882 297/230.14 |
| 9,487,298 B2 | * | 11/2016 | Quatmann ............... | B60N 2/26 |
| 2011/0031790 A1 | * | 2/2011 | Smith, Sr. ............ | A61G 5/1091 297/230.12 |

(Continued)

FOREIGN PATENT DOCUMENTS

| | | |
|---|---|---|
| JP | 3141092 U | 4/2008 |
| JP | 2008-110096 A | 5/2008 |

(Continued)

*Primary Examiner* — David R Dunn
(74) *Attorney, Agent, or Firm* — HAUPTMAN HAM, LLP

(57) ABSTRACT

It has at least one fixing plate arranged on the seat back and at least one support member arranged on the fixing plate, and the support member can be arranged at an arbitrary angle at an arbitrary position on the front surface of the fixing plate. Therefore, the position of the support member can be adjusted not only in the vertical direction but also in the horizontal direction with respect to the seat back, but also in the angle. Therefore, it is possible to increase the degree of freedom in the position and the angle of the support member as compared with the related art.

20 Claims, 19 Drawing Sheets

(56) References Cited

U.S. PATENT DOCUMENTS

| | | | |
|---|---|---|---|
| 2012/0049595 A1 | 3/2012 | Inou et al. | |
| 2012/0098310 A1* | 4/2012 | Bryer | A47C 7/0213 |
| | | | 297/284.4 |
| 2014/0300157 A1 | 10/2014 | Halliday et al. | |
| 2018/0027972 A1* | 2/2018 | Glasgow | B64D 11/0647 |
| 2018/0235374 A1* | 8/2018 | Kroll | A47C 7/425 |
| 2018/0280216 A1* | 10/2018 | Mascull | F16B 1/00 |

FOREIGN PATENT DOCUMENTS

| | | | |
|---|---|---|---|
| JP | 2009-241811 A | 10/2009 | |
| JP | 2012-045098 A | 3/2012 | |
| JP | 5530016 B1 * | 6/2014 | |

* cited by examiner

FIG. 2E
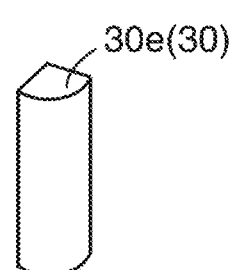
30e(30)
FIG. 2F
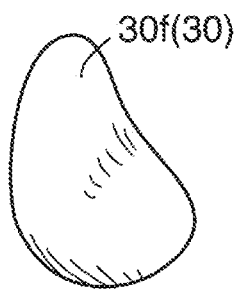
30f(30)
FIG. 3
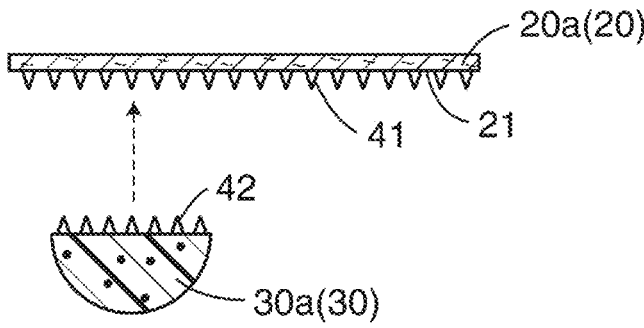
20a(20)
41
21
42
30a(30)
FIG. 4
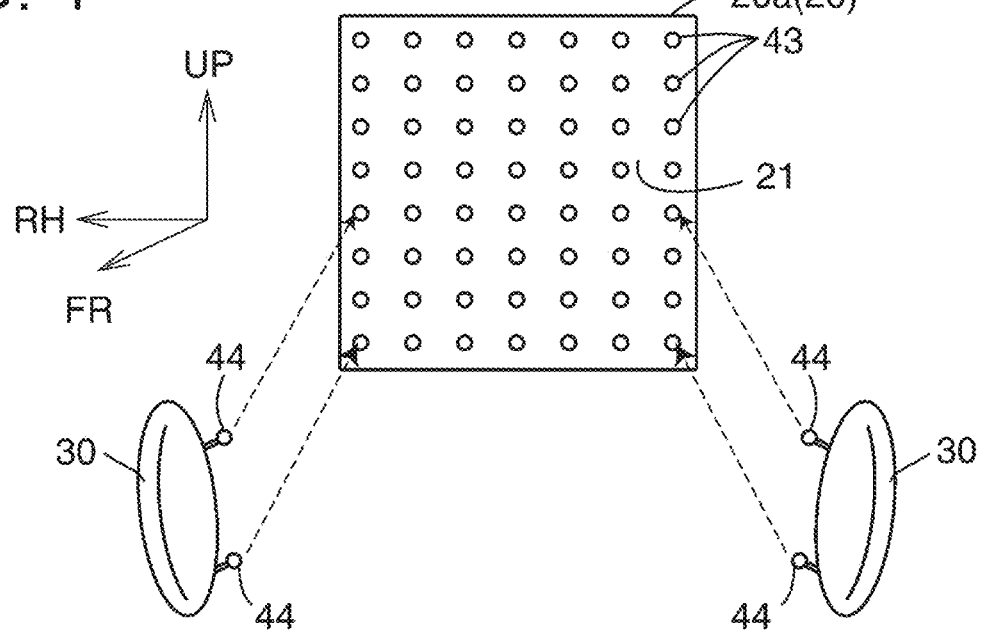
20a(20)
43
21
UP
RH
FR
44
30
44
44
30
44

POSTURE SUPPORT DEVICE

CROSS-REFERENCE TO RELATED APPLICATION

This application claims priority to Japanese Patent Application No. 2022-147681 filed on Sep. 16, 2022, and Japanese Patent Application No. 2023-080751 filed on May 16, 2023, each incorporated herein by reference in its entirety.

BACKGROUND

1. Technical Field

The present disclosure relates to a posture support device that supports a posture of a person seated in a seat.

2. Description of Related Art

Japanese Unexamined Patent Application Publication No. 2012-045098 (JP 2012-045098 A) discloses a technique for supporting the posture of a seated person by providing a support member formed with a projecting portion on a seat back.

Since the skeleton, the muscle strength, and the like differ depending on each individual, such as a difference in gender and age, it is desirable that the position and the angle of the support member be adjustable with respect to the seat back. However, in the technique disclosed in JP 2012-045098 A, the position of the support member can be adjusted in an up-down direction, but cannot be adjusted in a right-left direction and a front-rear direction. Further, the angle of the support member cannot be changed and cannot be adjusted. Therefore, there is room for improvement in increasing the degree of freedom in the position and the angle of the support member.

SUMMARY

An object of the present disclosure is to provide a posture support device capable of increasing the degree of freedom in the position and the angle of the support member as compared with the related art.

The present disclosure that achieves the above object is as follows.

1) First and Second Embodiments

A posture support device that supports a posture of a person seated in a seat according to the present disclosure includes:
  at least one fixing plate disposed on a seat back of the seat; and
  at least one support member disposed on the fixing plate.
The fixing plate is provided separately from the seat back and is disposed on a front surface of the seat back, or is disposed inside the seat back.
The support member is able to be disposed at any position on a front surface of the fixing plate at any angle.

(2) First and Second Embodiments

In (1), the fixing plate is difficult to be moved in at least one of an upward direction, a downward direction, a leftward direction, a rightward direction, a forward direction, and a rearward direction with respect to the seat back in a state in which the posture support device is used.

(3) First and Second Embodiments

In (2), the fixing plate is difficult to be moved in the at least downward direction with respect to the seat back in a state in which the posture support device is used.

(4) First and Second Embodiments

In (1), a whole or a part of the at least one support member is a first support member including a general surface portion and a protruding surface portion having a larger protrusion amount to a side where the person is seated in the seat than the general surface portion, and
  the protruding surface portion is provided in at least a part of a central portion in a width direction of the first support member when the first support member is disposed on the fixing plate at a basic angle at which a center line in the width direction of the first support member is in an up-down direction in a front view of the first support member.

(5) First and Second Embodiments

In (4), the first support member includes a lower portion when the first support member is disposed on the fixing plate at the basic angle, and an upper portion above the lower portion, and
  the lower portion has a larger protrusion amount to the side where the person is seated in the seat than the upper portion.

(6) First Embodiment

In (1), the fixing plate is provided separately from the seat back and is disposed on the front surface of the seat back, and
  the support member is attachable to and detachable from the fixing plate.

(7) First Embodiment

In (6), the fixing plate has a pattern regularly arranged at least on the front surface of the fixing plate.

(8) First Embodiment

In (7), the pattern of the fixing plate has at least one of a pattern regularly arranged such that a pattern element provided on a horizontal line extending in a right-left direction has a plurality of rows in an up-down direction, and a pattern regularly arranged such that a pattern element provided on a vertical line extending in the up-down direction has a plurality of rows in the right-left direction, in a front view of the fixing plate.

With the posture support device according to (1), the following effects can be obtained. The posture support device includes at least one fixing plate disposed on the seat back and at least one support member disposed on the fixing plate. Since the support member can be disposed at any position on the front surface of the fixing plate at any angle, the position and the angle of the support member can be adjusted, with respect to the seat back, not only in the up-down direction but also in the right-left direction. Therefore, it is possible to increase the degree of freedom in the position and the angle of the support member as compared with the related art.

With the posture support device according to (2), the following effects can be obtained. When the posture support device is used, the fixing plate is difficult to be moved in at least one of an upward direction, a downward direction, a leftward direction, a rightward direction, a forward direction, and a rearward direction with respect to the seat back. Therefore, it is possible to suppress the fixing plate from being deviated with respect to the seat back as compared with a case where the fixing plate is relatively easily movable in all of the upward direction, the downward direction, the leftward direction, the rightward direction, the forward direction, and the rearward direction. Therefore, it is possible to suppress the support member disposed on the fixing plate from being deviated with respect to the seat back.

With the posture support device according to (3), the following effects can be obtained. When the posture support device is used, the fixing plate is difficult to be moved in the at least downward direction with respect to the seat back. Therefore, it is possible to suppress the fixing plate from being deviated in the downward direction, which is most likely to cause deviation of the fixing plate when in use, with respect to the seat back as compared with a case where the fixing plate is relatively easily movable in the downward direction. Therefore, it is possible to suppress the support member disposed on the fixing plate from being deviated in the downward direction, which is most likely to cause deviation when in use, with respect to the seat back.

With the posture support device according to (4), the following effects can be obtained. A whole or a part of the at least one support member is a first support member including a general surface portion and a protruding surface portion, and the protruding surface portion is provided in at least a part of a central portion in a width direction of the first support member when the first support member is disposed on the fixing plate at an basic angle, so that it is possible to increase the area of the contact portion between the support member and the body of the seated person, the load per unit area in the contact portion is reduced, and the seated person can hardly feel a foreign body sensation or hardly feel uncomfortable.

With the posture support device according to (5), the following effects can be obtained. The first support member includes a lower portion when the first support member is disposed on the fixing plate at the basic angle, and an upper portion above the lower portion, and the lower portion has a larger protrusion amount to the side where the person is seated in the seat than the upper portion, so that it is possible to increase the area of the contact portion between the support member and the body of the seated person, the load per unit area in the contact portion is reduced, and the seated person can hardly feel a foreign body sensation or hardly feel uncomfortable.

With the posture support device according to (6), the following effects can be obtained. Since the fixing plate is provided separately from the seat back and is disposed on the front surface of the seat back, and the support member is attachable to and detachable from the fixing plate, the support member can be relatively easily attached to any position on the front surface of the fixing plate at any angle. In addition, by preparing a plurality of types of support members having different projection amounts (bulges) in the forward direction from the fixing plate, and selectively using the support members, the positions of the support members can be adjusted with respect to the seat back in the front-rear direction as well as in the up-down direction and the right-left direction.

With the posture support device according to (7), the following effects can be obtained. Since the fixing plate has a pattern regularly arranged at least on the front surface of the fixing plate, the optimum arrangement of the support member can be easily reproduced as compared with a case where the fixing plate does not have a pattern.

With the posture support device according to (8), the following effects can be obtained. The pattern of the fixing plate has at least one of a pattern regularly arranged such that a pattern element provided on a horizontal line extending in a right-left direction has a plurality of rows in an up-down direction, and a pattern regularly arranged such that a pattern element provided on a vertical line extending in the up-down direction has a plurality of rows in the right-left direction, in a front view of the fixing plate, so that the seated person easily remembers the position where the support member is arranged, and the optimum arrangement of the support member can be easily reproduced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2E is a perspective view of a support member in a posture support device according to a first embodiment of the present disclosure, when the support member is a quarter cylinder;

FIG. 2F is a perspective view of a support member in a posture support device according to a first embodiment of the present disclosure when the support member is in a 3D configuration;

FIG. 3 is an exploded schematic cross-sectional view of a fixing plate and a support member in the posture support device according to the first embodiment of the present disclosure;

FIG. 4 is an exploded perspective view of a fixing plate and a support member in a modification of the posture support device according to the first embodiment of the present disclosure;

FIG. 8 is a front view and a partial enlarged view of a fixing plate in the posture support device of the first embodiment of the present disclosure, in a case where the fixing plate has a pattern in which the fixing plate is regularly arranged;

DETAILED DESCRIPTION OF EMBODIMENTS

Figure 11:
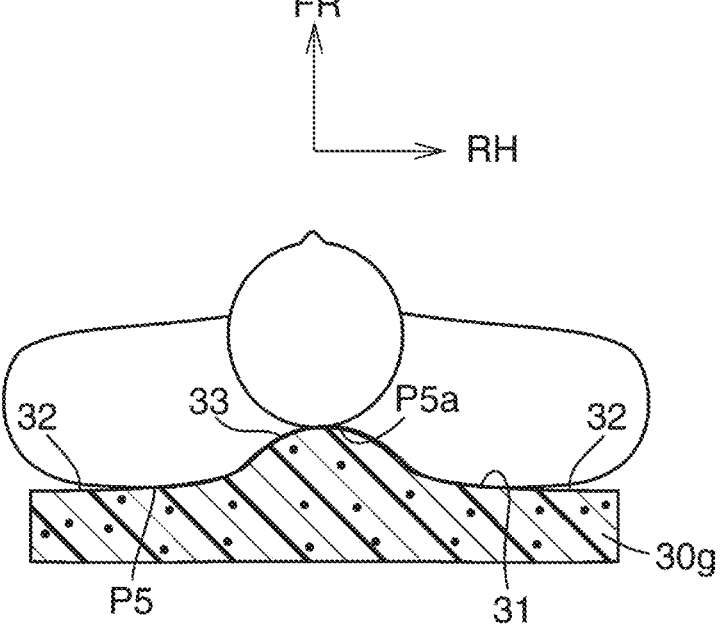
FIG. 11 is a schematic cross-sectional view of a first support member in the posture support device of the first embodiment of the present disclosure.
Figure 12:
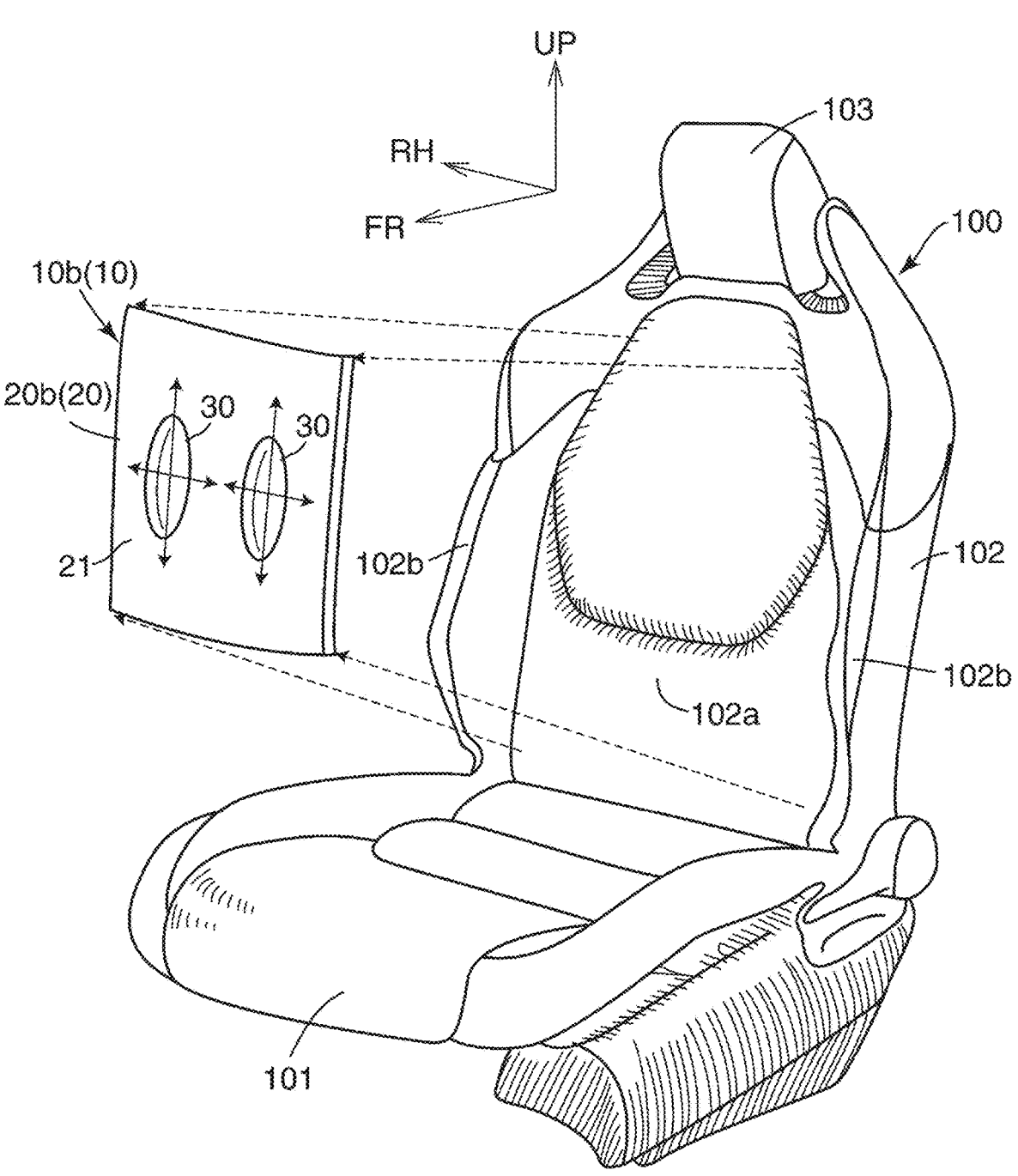
FIG. 12 is a perspective view of a posture support device according to a second embodiment of the present disclosure.

Hereinafter, the posture support device 10 according to the embodiment of the present disclosure will be described with reference to the drawings. FIG. 1 to FIG. 11 show the posture support device according to the first embodiment of the present disclosure, and FIG. 12 shows the posture support device according to the second embodiment of the present disclosure. In the drawings, UP indicates the upward direction of the seat, FR indicates the forward direction of the seat, and RH indicates the rightward direction of the seat. First, description will be provided on common parts and components through each embodiment of the present disclosure.

The posture support device (hereinafter, also simply referred to as a device) 10 of the embodiment of the present disclosure is a device that supports the posture of the seated person of the seat 100. The seat 100 is, for example, a driver's seat mounted on a vehicle. However, the seat 100 may be a vehicle seat such as a passenger seat, a rear seat, or an auxiliary seat. The seat 100 may be a chair used in a house or the like, instead of a vehicle seat.

Figure 1:
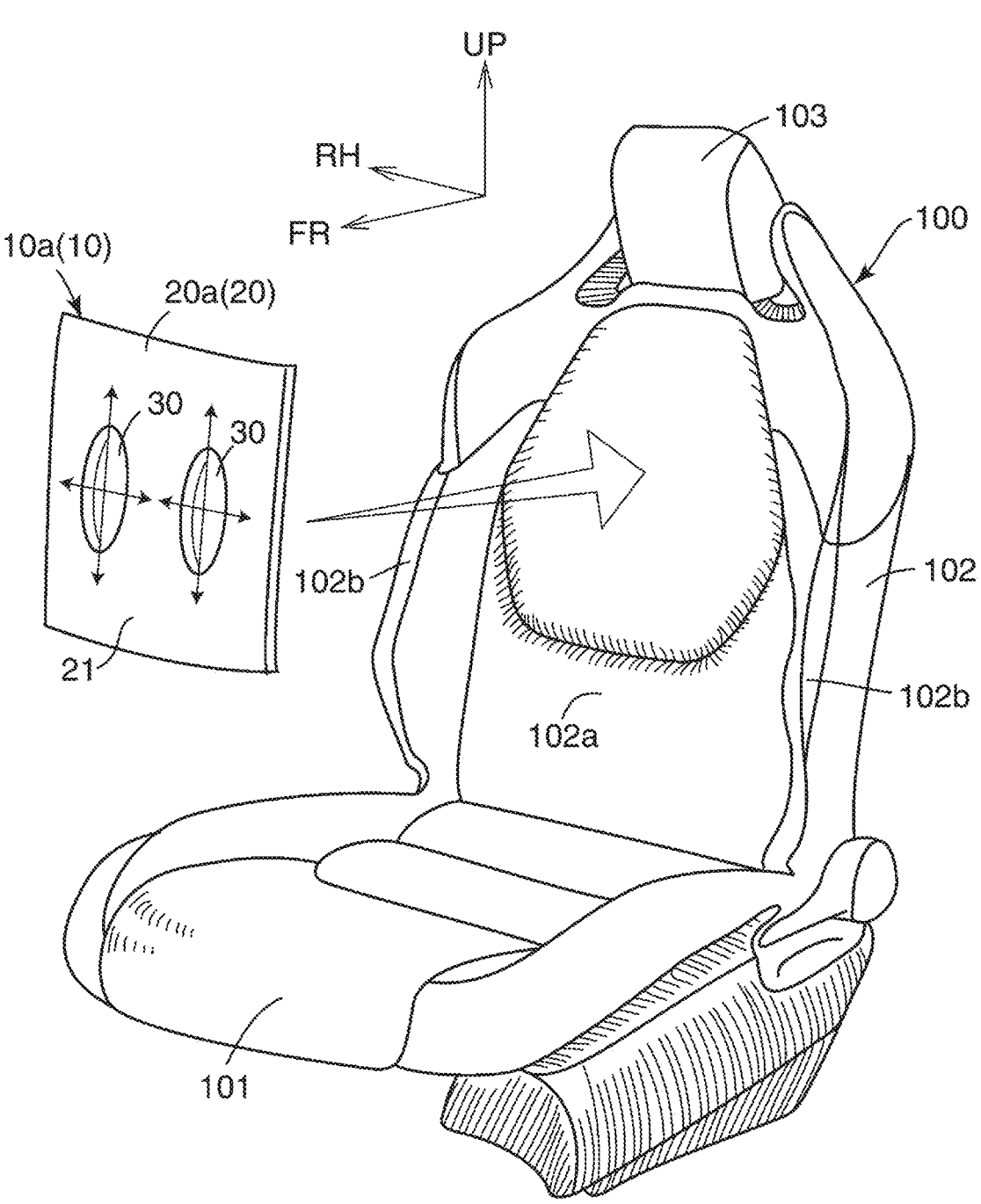
FIG. 1 is a perspective view of a posture support device according to a first embodiment of the present disclosure.

As shown in FIG. 1, the seat 100 includes a seat cushion 101 to be seated, a seat back 102 disposed at a rear end portion of the seat cushion 101 and used as a seat back of a seated person, and a headrest 103 provided above the seat back 102 and supporting the head of the seated person from the rear side. The seat back 102 has side support 102*b* at both left and right end portions, the front end of which bulges forward from the left and right central portion 102*a* of the seat back 102. However, in the present embodiment and the illustrated example, the side support 102*b* and the headrest 103 are provided, but the side support 102*b* may not be provided in the seat back 102, and the headrest 103 may not be provided.

The device 10 includes a fixing plate 20 disposed on the seat back 102 and a support member 30 disposed on the fixing plate 20.

The fixing plate 20 may be referred to as a base. At least one fixing plate 20 is disposed on the seat back 102. In the illustrated example, only one fixing plate 20 is disposed on the seat back 102. The fixing plate 20 may be made of fiber, metal, or resin. When the fixing plate 20 is made of fibers, the fixing plate 20 may be a fabric made by knitting or weaving fibers, may be a nonwoven fabric, or may be a fabric close to a nonwoven fabric. When the fixing plate 20 is made of resin, the fixing plate 20 may be made of a soft resin such as rubber.

The fixing plate 20 is disposed at a position that wraps with at least a portion of the left and right central portions 102*a* of the seat back 102 in a front view, that is, in a front view. Further, in the seat in which the side support 102*b* is set, the fixing plate 20 may be disposed at a position that wraps with the side support 102*b*, or may not be disposed at a position that wraps with the side support 102*b*.

The fixing plate 20 may have a polygonal shape such as a rectangular shape, a circular shape including an ellipse or an oval shape, or any other shape. As another shape, for example, the same shape (including substantially the same shape) as the left and right central portions 102*a* of the seat back 102 can be considered.

As shown in FIGS. 1 and 12, the fixing plate 20 is formed separately from the seat back 102 and is disposed on the front surface of the left and right central portion 102*a* of the seat back 102 (Example 1), or is disposed on the front portion of the inside of the left and right central portion 102*a* of the seat back 102 (Example 2). Note that the front portion of the inside of the left and right central portions 102*a* of the seat back 102 is a front portion when the inside is divided into two equal parts along the thickness of the seat back 102.

The fixing plate 20 may be movable in at least one of a vertical direction, a horizontal direction, and a front-rear direction with respect to the seat back 102, that is, may be positionally adjustable in order to adjust an arrangement position with respect to the seat back 102. However, in the use state, the fixing plate 20 is difficult to move in at least one of the up, down, left, right, front, and rear directions with respect to the seat back 102. The use state is a state in which the seated person is actually using, and when the position is adjustable, the position is adjusted and the seated person is actually using. It is desirable that the fixing plate 20 is difficult to move in at least a downward direction with respect to the seat back 102 in the use state. This is because the position is easily displaced in the downward direction in the use state.

At least one support member 30 is disposed on the front surface 21 of the fixing plate 20. Incidentally, FIG. 1, in FIG. 12, the case where two support members 30 are disposed on the front surface 21 of the fixing plate 20 is shown, the number of support members 30 disposed on the front surface 21 of the fixing plate 20 may be one, may be three or more. The support member 30 may be made of urethane, metal, or resin. When the support member 30 is made of urethane, the support member 30 may be made of the same material as the pad provided in the seat back 102. When the support member 30 is made of resin, the support member 30 may be made of a soft resin such as rubber. As the material of the support member 30, only the same type of hardness may be used, or a plurality of types of different hardness may be used. Each support member 30 can be disposed at an arbitrary position on the front surface 21 of the fixing plate 20 at an arbitrary angle.

Figure 2A:
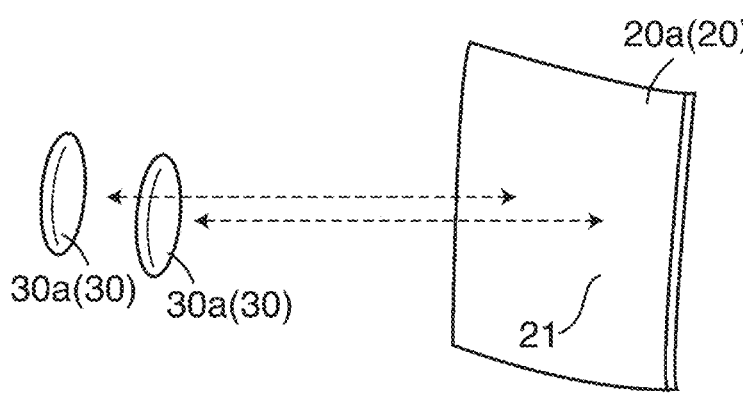
FIG. 2A, in the posture support device of the first embodiment of the present disclosure, when the support member is semi-elliptical sphere is an exploded perspective view of the fixing plate and the support member.
Figure 2B:
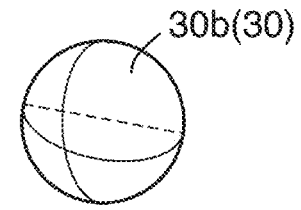
FIG. 2B is a perspective view of a posture support device according to a first embodiment of the present disclosure, when a support member is hemispherical.
Figure 2C:
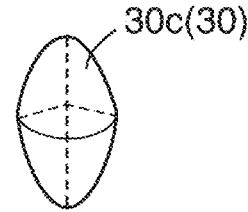
FIG. 2C is a perspective view of a support member in a posture support device according to a first embodiment of the present disclosure when the support member has a ¼ spherical shape.
Figure 2D:
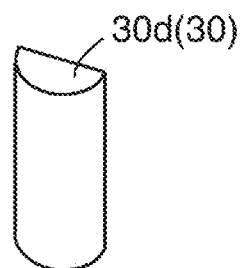
FIG. 2D is a perspective view of a posture support device according to a first embodiment of the present disclosure, in which a support member is semi-cylindrical.

The configuration of the support member 30 is not particularly limited, as shown in FIGS. 2A to 2F. FIG. 2A shows a support member 30*a* in the form of a semi-elliptical sphere, i.e. a semi-rugby ball. FIG. 2B shows a hemispherical support member 30*b*. FIG. 2C shows a ¼ spherical support member 30*c*. FIG. 2D shows a semi-cylindrical support member 30*d*. FIG. 2E shows a ¼ cylindrical support member 30*e*. FIG. 2F shows another 3D of support member 30*f*. The size of the support member 30 is not particularly limited.

As shown in FIGS. 10A to 10M, all or part of the at least one support member 30 may be a first support member 30*g* having a general surface portion 32 and a protruding surface portion 33 having a larger amount of protrusion toward the seated person than the general surface portion 32. The first support member 30*g* has a support surface 31 that is a seated person-side surface and supports the attitude of the seated person, and the general surface portion 32 and the protruding surface portion 33 are provided on the support surface 31.

The protruding surface portion 33 is a portion in which, when the first support member 30*g* is disposed on the front surface 21 of the fixing plate 20 at a basic angle in which the widthwise center line CL of the first support member 30*g* is in the up-down direction in the front view of the first support member 30*g*, the amount of protrusion toward the seated person is larger than the amount of protrusion toward the general surface portion 32 at the same height position.

The protruding surface portion 33 is provided in at least a part of the widthwise central portion of the first support member 30*g* when the first support member 30*g* is disposed on the front surface 21 of the fixing plate 20 at the basic angle.

In the first support member 30*g*, the lower portion 34 when the first support member 30*g* is disposed on the front surface 21 of the fixing plate 20 at the basic angle may protrude more toward the seated person than the upper portion 35.

FIGS. 10A to 10E show an exemplary first support member 30*g* where the protrusion amounts of the lower portion 34 and the upper portion 35 are the same.

Figure 10A:
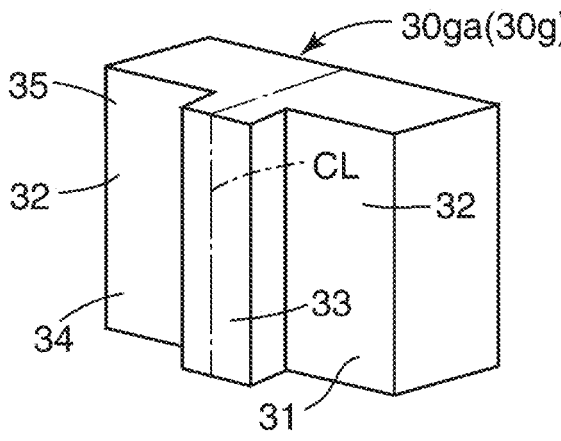
FIG. 10A is a perspective view of a first support member in a posture support device according to a first embodiment of the present disclosure.

FIG. 10A shows a first support member 30*ga* in which the general surface portion 32 is a flat surface and the protruding surface portion 33 is a U-shaped cross section.

Figure 10B:
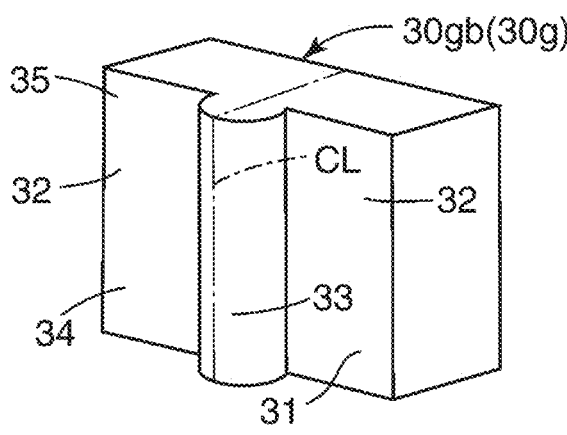
FIG. 10B is a perspective view of a first support member in a posture support device according to a first embodiment of the present disclosure.

FIG. 10B shows a first support member 30*gb* in which the general surface portion 32 is a flat surface and the protruding surface portion 33 is a semicircular cross-sectional surface.

Figure 10C:
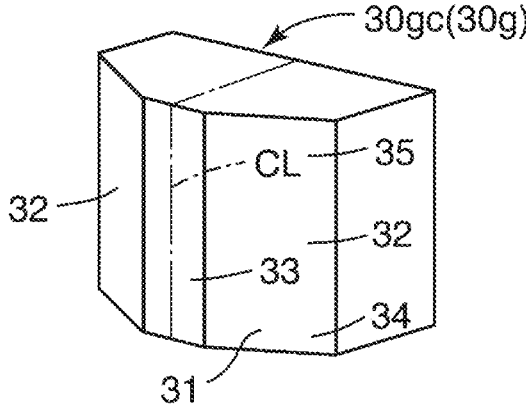
FIG. 10C is a perspective view of a first support member in a posture support device according to a first embodiment of the present disclosure.

FIG. 10C shows a first support member 30*gc* in which the general surface portion 32 is a convex inclined surface and the protruding surface portion 33 is a rectangular flat surface.

Figure 10D:
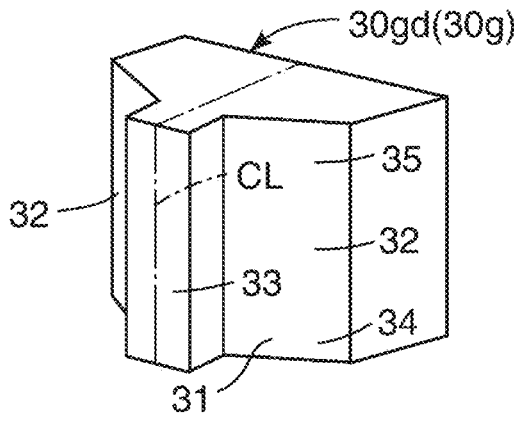
FIG. 10D is a perspective view of a first support member in a posture support device according to a first embodiment of the present disclosure.

FIG. 10D shows a first support member 30*gd* in which the general surface portion 32 is a convex inclined surface and the protruding surface portion 33 is a U-shaped surface in cross section.

Figure 10E:
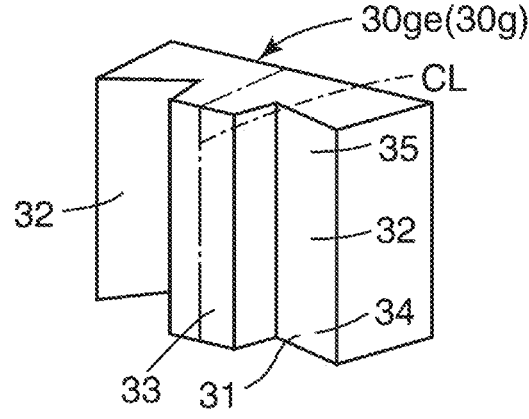
FIG. 10E is a perspective view of a first support member in a posture support device according to a first embodiment of the present disclosure.

FIG. 10E shows a first support member 30*ge* in which the general surface portion 32 is a concave inclined surface and the protruding surface portion 33 is a U-shaped surface in cross section.

In addition, FIGS. 10F to 10M show an exemplary first support member 30*g* in which the lower portion 34 has a larger protrusion amount than the upper portion 35.

Figure 10F:
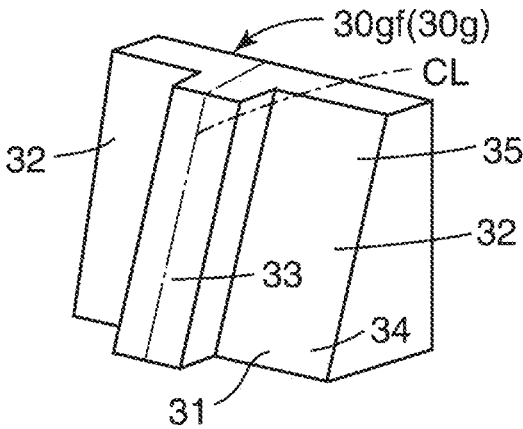
FIG. 10F is a perspective view of a first support member in a posture support device according to a first embodiment of the present disclosure.

FIG. 10F shows a first support member 30*gf* in which the protruding amounts of the general surface portion 32 and the protruding surface portion 33 become larger as going downward, and the protruding surface portion 33 has a U-shaped cross section.

Figure 10G:
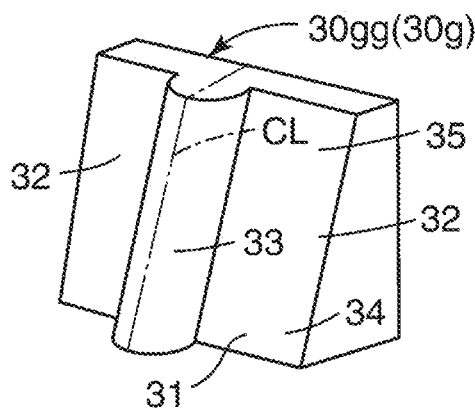
FIG. 10G is a perspective view of a first support member in a posture support device according to a first embodiment of the present disclosure.

FIG. 10G shows a first support member 30*gg* in which the protruding amounts of the general surface portion 32 and the protruding surface portion 33 become larger as they go downward, and the protruding surface portion 33 is a semicircular cross-sectional surface.

Figure 10H:
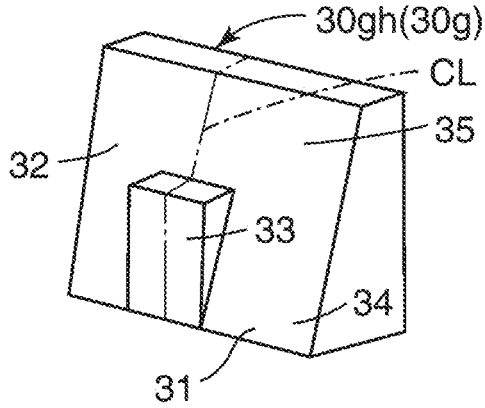
FIG. 10H is a perspective view of a first support member in a posture support device according to a first embodiment of the present disclosure.

FIG. 10H shows a first support member 30*gh* in which the projection amount of the general surface portion 32 increases as it goes downward, and the protruding surface portion 33 is provided only on the lower portion 34, and the projection amount from the general surface portion 32 becomes smaller as it goes downward.

Figure 10I:
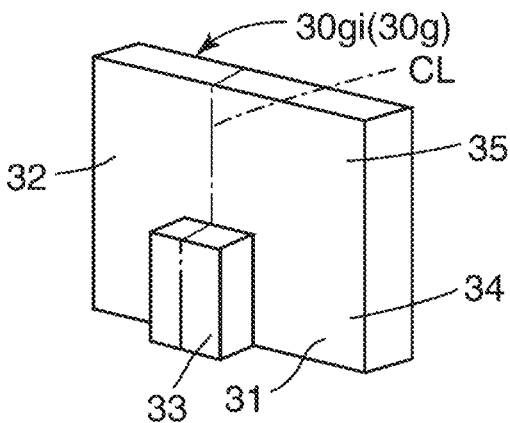
FIG. 10I is a perspective view of a first support member in a posture support device according to a first embodiment of the present disclosure.

FIG. 10I shows a first support member 30*gi* in which the protrusion of the general surface portion 32 is constant, and the protruding surface portion 33 is provided only on the lower portion 34 and has a U-shaped cross section.

Figure 10J:
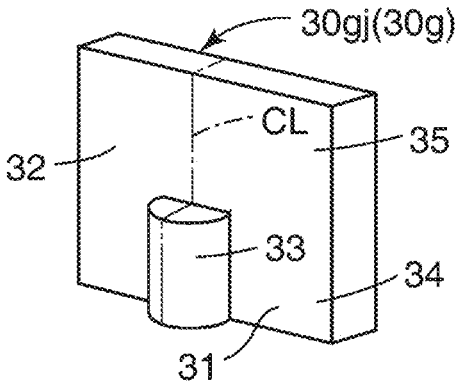
FIG. 10J is a perspective view of a first support member in a posture support device according to a first embodiment of the present disclosure.

FIG. 10J shows a first support member 30*gj* in which the protrusion of the general surface portion 32 is constant, and the protruding surface portion 33 is provided only on the lower portion 34 and has a semicircular cross section.

Figure 10K:
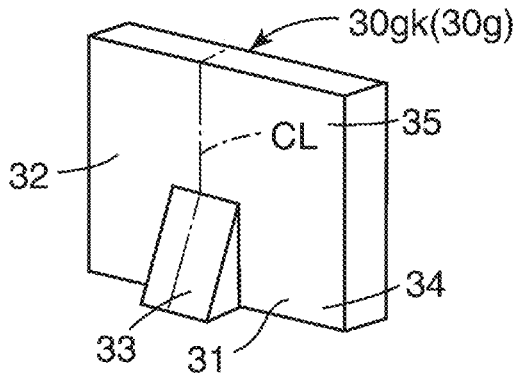
FIG. 10K is a perspective view of a first support member in a posture support device according to a first embodiment of the present disclosure.

FIG. 10K shows a first support member 30*gk* in which the amount of protrusion of the general surface portion 32 is constant and the amount of protrusion from the general surface portion 32 is larger as the protruding surface portion 33 is provided only on the lower portion 34 and goes downward.

Figure 10L:
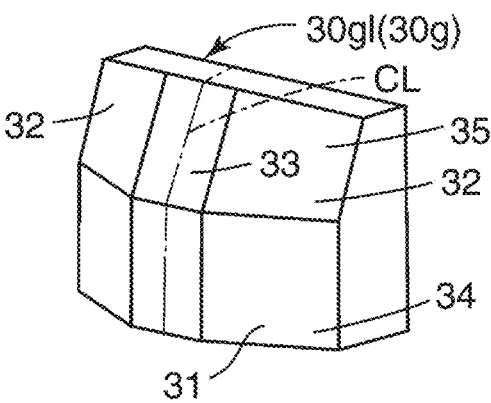
FIG. 10L is a perspective view of a first support member in a posture support device according to a first embodiment of the present disclosure.

FIG. 10L shows a first support member 30*gl* in which the general surface portion 32 is a convex inclined surface and the protruding surface portion 33 is a rectangular flat surface, and only the upper portion 35, the protruding amounts of the general surface portion 32 and the protruding surface portion 33 become larger as they go downward.

Figure 10M:
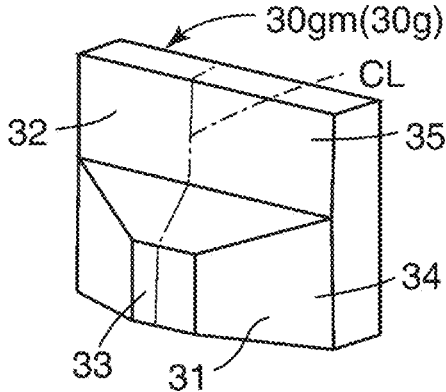
FIG. 10M is a perspective view of a first support member in a posture support device according to a first embodiment of the present disclosure.

FIG. 10M shows a first support member 30*gm* in which, in the upper portion 35, the amount of projection of the general surface portion 32 is constant, the protruding surface portion 33 is not provided, and in the lower portion 34, the general surface portion 32 is a convex inclined surface and the protruding surface portion 33 is a rectangular flat surface. However, the first support member 30*g* may have a shape other than the shape shown in FIGS. 10A to 10M.

Here, the operation and effects of portions common to all embodiments of the present disclosure will be described.

There are individual differences in the human body. For example, the ratio of the head to the trunk, and the like, such as age, sex, height difference, skeletal strain, and the like, are not clear. On the other hand, vehicle seats differ depending on the vehicle type and the manufacturer, but when viewed in terms of vehicle type limitation, they are generally centralized, and it is currently impossible to select a seat suitable for individual differences when purchased by a user. Therefore, the present vehicle seat cannot cope with indi-vidual differences. The following are some examples of the causes of individual differences in the human body and the current situation.

Case 1

When the human body is viewed from the side, generally, the lumbar back is narrower in women than in men. This is mainly caused by the difference in the inclination of the pelvis.

(i) More specifically, the pelvis is connected to the spine, which is an assembly of vertebrae consisting of the cervical, thoracic, lumbar, sacral, and coccygeal bones, i.e., the sacrum/coccygeal bone at the lower end of the spine, and as the pelvis tilts, the sacrum/coccygeal bone also tilts accord-ingly. The assembly of vertebrae present on the sacrum/coccyx also changes shape accordingly. And, in general, the inclination of the pelvis is different in men and women, and the male tends to incline the pelvis backward, and the female tends to incline the pelvis forward. This causes the female sacrum/coccyx to tilt forward with a feeling of bowing rather than the male sacrum/coccyx. Therefore, a woman is generally a silhouette with a lumbar back narrowed in a side view than a man. However, since there are individual differences among women, there are also those with large constrictions and those with small constrictions, as well as those with large constrictions in men.

Figure 13A:
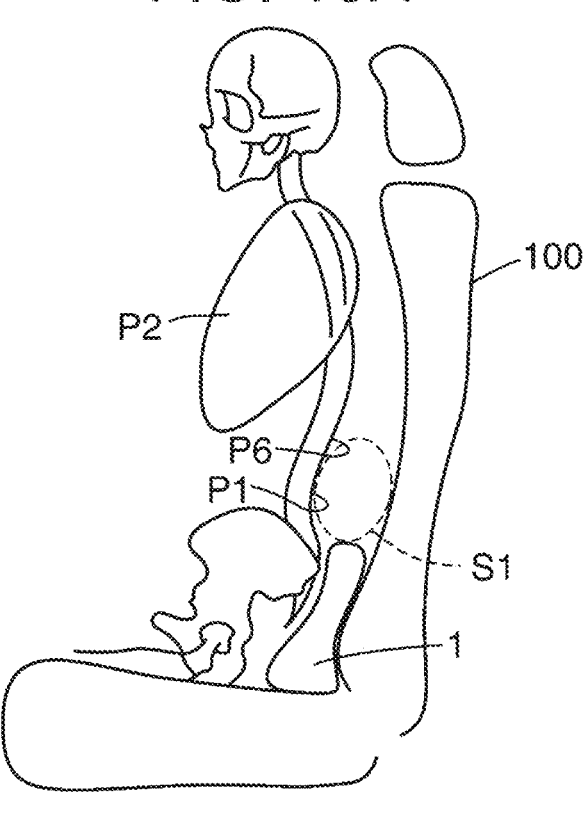
FIG. 13A is a schematic side view of a skeleton and a posture support device according to a comparative example of a posture support device according to an embodiment of the present disclosure.
Figure 13B:
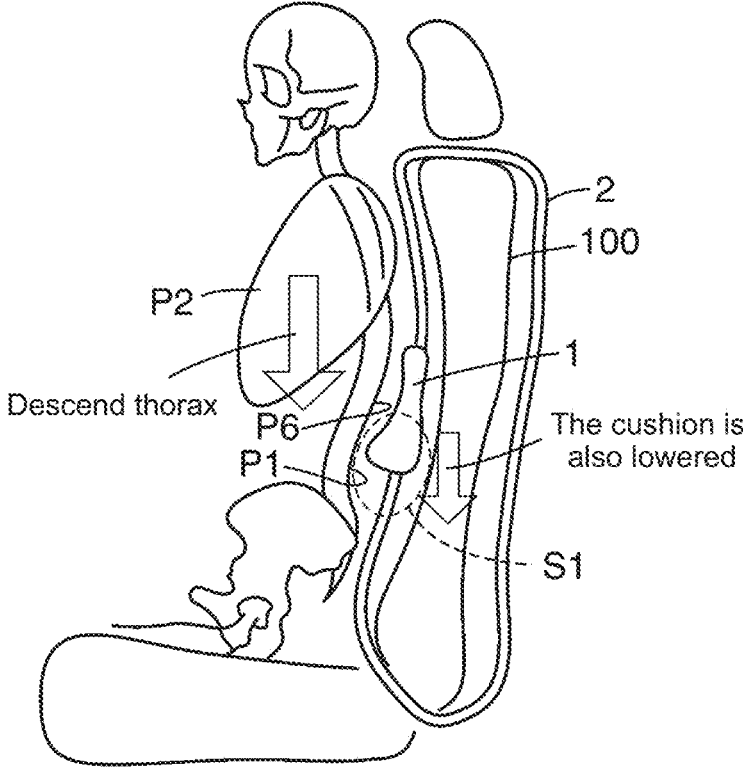
FIG. 13B is a schematic side view of a skeleton and a posture support device according to a comparative example of a posture support device according to an embodiment of the present disclosure.

(ii) Next, consider a case where a person with a silhouette whose lumbar back is constricted sits on a seat. As shown in FIGS. 13A and 13B, although only the skeleton is shown for the sake of simplicity, as shown in FIG. 13A, a gap or space S1 occurs between the lumbar back P1 and the seat 100 as the constriction of the lumbar back P1 increases. Note that, in FIG. 13A, the cushion 1 is placed on the seat 100, but a space S1 occurs regardless of the presence or absence of the cushion 1. In order to maintain this posture, a corresponding muscle force is required, and it is considered that the lumbar back P1 of the waist is retreated so as to fill the space S1 when the vehicle is driven for a long time. When the lumbar back P1 is retracted, the lumbar back P1, which has been constricted, is stretched, increasing the burden on the lumbar region. Also, generally as the lumbar back P1 retracts, the rib or thoracic P2 advances instead. Then, in order to see the front, the face needs to be raised, and the posture is such that a load is applied to the neck. Therefore, the burden on the neck is increased.

That is, if there is a space S1 between the lumbar back P1 and the seat 100, it is considered to be one of the factors that place a burden on the waist and the neck.

(iii) The presence of a space S1 between the lumbar back P1 and the seat 100 requires muscular strength to maintain a comfortable position. In addition, if muscle strength can-not be maintained, the posture may collapse, resulting in a burden on the body. Therefore, as shown in FIG. 13A as a corresponding example 1, it is conceivable to support the posture by placing a commercially available cushion 1 on the seat 100 and sandwiching the cushion between the back and the seat back. In addition, as shown in FIG. 13B as a corresponding example 2, it is conceivable to fix the cushion 1 by using the fixing member 2 that circulates the seat back in the up-down direction or the left-right direction.

However, in the corresponding example 1 shown in FIG. 13A, the cushion 1 is placed directly on the seat 100, so depending on the relation between the size of the cushion 1 and the person to be used, the cushion 1 may fall outside the desired space S1 such as the position, so it cannot be adapted to individual differences.

Further, in the corresponding example 2 shown in FIG. 13B, although the position of the cushion 1 can be adjusted in the circumferential direction of the fixing member 2, that is, in the up-down direction or the left-right direction, the fixing member 2 is not fixed to the seat 100, so that, for example, when the posture of the seated person is shifted and the thoracic P2 is lowered, the cushion 1 is also lowered, and when the seated person returns to the comfortable posture, the position of the cushion 1 is shifted, so that the position is not aligned and the effectiveness cannot be obtained.

Case 2

When the human body is viewed from the front, generally, the lateral abdomen is narrower in women than in men. This is mainly caused by differences in the size of the thorax, the width of the pelvis, and the length of the femoral head.

(i) In general, in males and females, the size of the thorax, the width of the pelvis, and the length of the femoral head are related as shown in the table below.

Table 1

|  | Male | Women |
|---|---|---|
| Size of the thorax | Large | Small |
| Pelvic width | Narrow | Wide |
| Femoral head length | Short | Long |

Due to the relationships shown in Table 1, the lateral abdomen of a woman is generally a constricted silhouette when viewed from the front compared to a man. In particular, the width of the pelvis is generally considered to have a large contribution to the constriction of the lateral abdomen. However, since there are individual differences among women, there are also those with large constrictions and those with small constrictions, as well as those with large constrictions in men.

Figure 14:
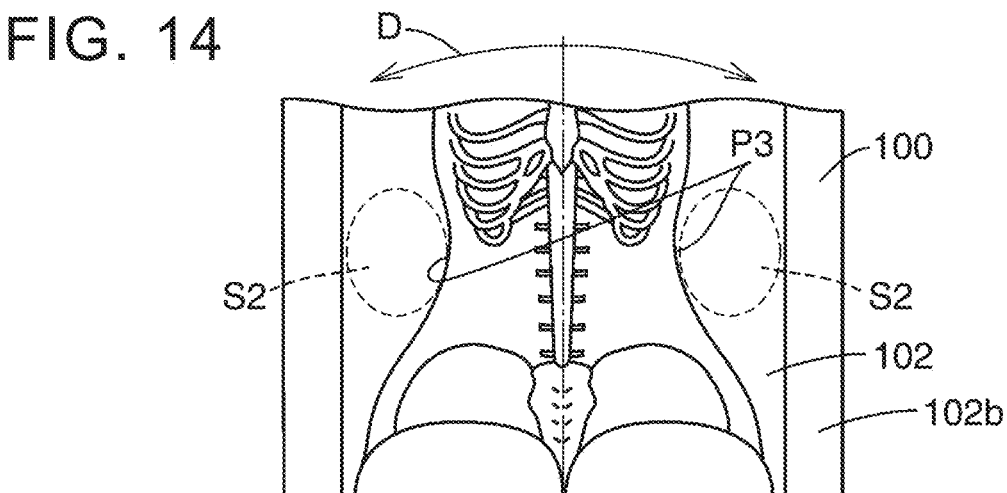
FIG. 14 is a schematic front view of a seat and a seated person in a comparative example of a posture support device according to an embodiment of the present disclosure.

(ii) Next, let us consider the case where a person in the silhouette with a constricted lateral abdomen sits on the seat. As shown in FIG. 14, as the constriction of the lateral abdominal P3 increases, a gap or space S2 is created between the lateral abdominal P3 and the seat 100, and more specifically, between the lateral abdominal P3 and the side support 102b of the seat back 102. In this state, when the vehicle travels at a corner or the like and receives the side G, the support for supporting the body is small, and the body is shaken. When receiving the side G, the body tends to swing to the left and right sides, but since the hip P4 contacts the seat 100 under the gravitational force, the frictional force is also strong, and it is difficult to swing with respect to the upper body. On the other hand, since the lateral abdominal P3 has a space S2 between itself and the side support 102b, there is no support member, and it is easily swung to the left and right. Therefore, as indicated by an arrow D in the drawing, the upper body is swung like a pendulum about the hip P4. That is, if there is a space S2 between the lateral abdominal P3 and the seat 100, it is difficult to support the posture during traveling, and a burden is imposed on the body in order to maintain the posture.

(iii) If there is a space S2 between the lateral abdominal P3 and the seat 100, the upper body is swung to the left and right, and it is difficult to maintain a comfortable posture. For this reason, it is conceivable to take measures such as setting a commercially available cushion so as to fill the space S2 on both sides of the lateral abdominal P3. According to this configuration, it is possible to reduce the amount by which the upper part of the upper body, such as the shoulder band and the head, is swung to the left and right.

However, even when the cushion is placed directly on the seat 100, even when the cushion is fixed by providing a fixing material that circulates around the seat back, there remain problems such as that the cushion cannot be adapted to the individual difference and the position of the cushion is displaced, as in the case 1.

Case 3

Muscle strength is also required to maintain the sitting posture. (i) In general, the muscle force for holding the back muscle (streak) is referred to as the erector spinae existing in the vicinity of the spine. In addition, the lumbar square muscles in the lumbar back are known as muscles supporting the erector spinae muscles.

(ii) Generally, when the muscle force holding the posture decreases after the sitting posture is taken, the thorax tends to fall. Muscle strength varies among individuals, but muscle weakness usually progresses with increasing age. In addition, there are people in the world who lack the muscular strength necessary to maintain their posture, such as those who have low muscular strength natively or those who have suffered muscle weakness due to accidents or the like. In order to support this, the thoracic P2 needs to be supported from below, as shown in FIG. 15, because the thorax tends to fall when the muscle force holding the posture decreases.

Figure 15:
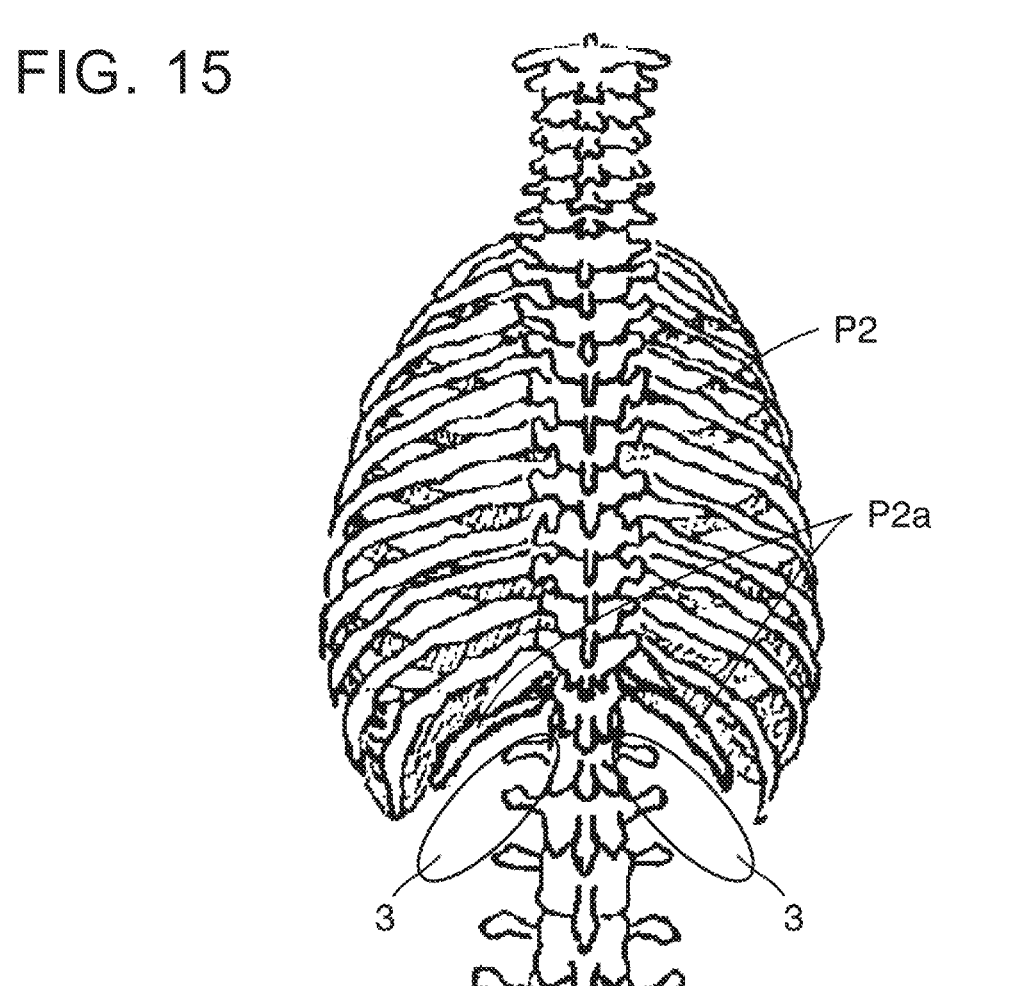
FIG. 15 is a rear view of the skeleton and the support member in a comparative example of the posture support device according to an embodiment of the present disclosure.

(iii) FIG. 15 is a rear view of the human skeleton. Typically, the rib or thoracic P2 consists of 12 pairs of left and right, and P2a of the lowermost bone (typically the twelfth rib) is a floating bone and has a C-shape. The twelfth rib P2a is supported from below by the cushion 3 of the shape of an inverted V-shape, and it is considered that the muscular force for holding the posture can be supported.

However, even in the case where the cushion 3 is placed directly on the seat, even in the case where the cushion 3 is fixed by providing a fixing material which circulates around the seat back, as in Cases 1 and 2, problems such as that it cannot be adapted to the individual difference, and that the position of the cushion 3 is displaced remain.

Case 4

(i) Though the spine is usually seated correctly, it may be in the sitting posture in which the spine is twisted at some time when the driver is driving the car because the posture is bad. I want to support the correct seating position, but there is no such cushion. (ii) There are differences in the right and left sides of the body, and the cushions that are generally available on the market do not fit themselves, so the cushions that are desired by individuals are thousands of different.

A support device that can respond to individual problems as much as possible by one item semi-orderly in response to problems arising from skeletal differences between men and women in Case 1 and Case 2, problems in sitting posture due to muscle weakness, etc. as in Case 3, and problems with individual problems in Case 4 are desired.

(A) The present disclosure includes at least one fixing plate 20 disposed on the seat back 102 and at least one support member 30 disposed on the fixing plate 20, and the support member 30 can be disposed at any position on the front surface 21 of the fixing plate 20 at any angle. Therefore, the position of the support member 30 can be adjusted not only in the vertical direction but also in the horizontal direction with respect to the seat back 102, but also in the angle. Therefore, it is possible to increase the degree of freedom in the position and angle of the support member 30 as compared with the related art.

As a result, one item, i.e., one device 10, can respond as much as possible to individuals in a semi-order manner to the troubles arising from skeletal differences between men and women in Case 1, Case 2, the troubles in sitting posture due to muscle weakness, etc., as in Case 3, and the troubles in individual issues in Case 4.

FIGS. 7A to 7F show a state in which the fixing plate 20 is attached prior to the support member 30 being disposed, and an exemplary state in which the support member 30 is disposed with respect to the fixing plate 20.

Figure 7A:
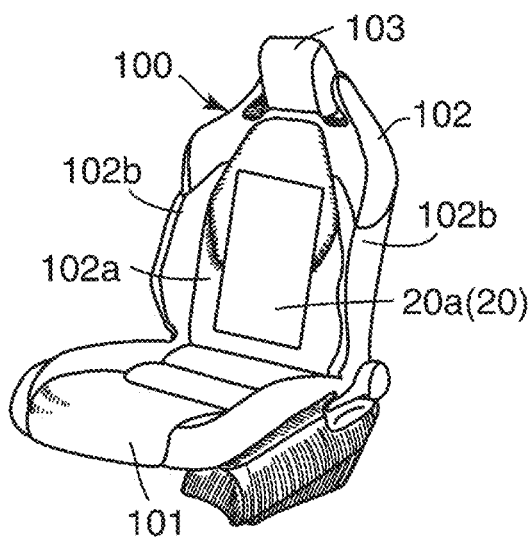
FIG. 7A is a perspective view illustrating an example of a posture support device according to a first embodiment of the present disclosure, in which a support member is mounted on a fixing plate.

FIG. 7A shows a state in which the fixing plate 20 is attached prior to the arrangement of the support member 30.

Figure 7B:
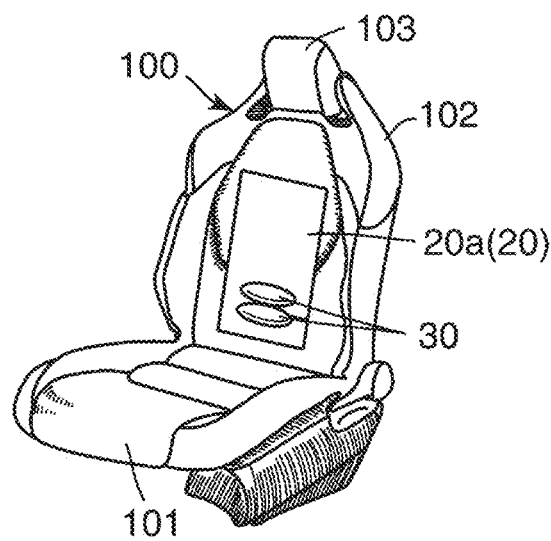
FIG. 7B is a perspective view illustrating an arrangement example of a support member in a posture support device according to a first embodiment of the present disclosure.

FIG. 7B shows a condition in which the support member 30 is set on the lumbar back in the lumbar back retraction correspondence introduced in the above-described <Case 1>.

Figure 7C:
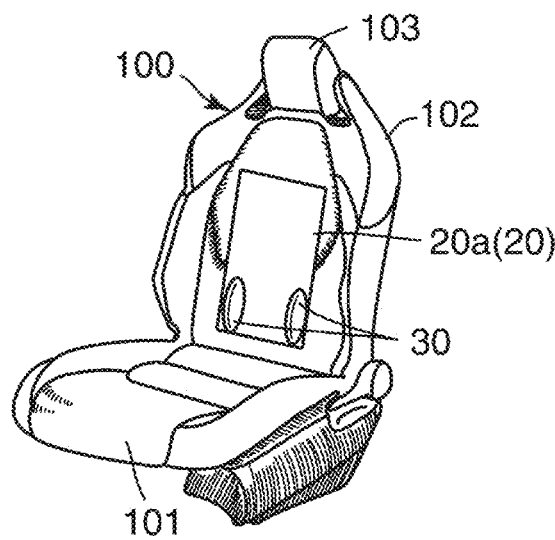
FIG. 7C is a perspective view illustrating an arrangement example of a support member in a posture support device according to a first embodiment of the present disclosure.

FIG. 7C shows a condition in which the support member 30 is set on both sides of the transverse abdomen in the lateral abdomen correspondence introduced in the above-described <Case 2>.

Figure 7D:
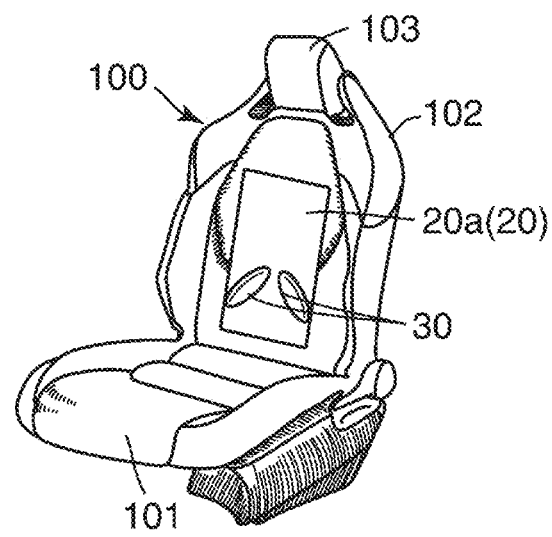
FIG. 7D is a perspective view illustrating an arrangement example of a support member in a posture support device according to a first embodiment of the present disclosure.

FIG. 7D shows the chest descent response introduced in the above-described Case 3 in which the support member 30 is set in a C-shape on the lumbar back.

Figure 7E:
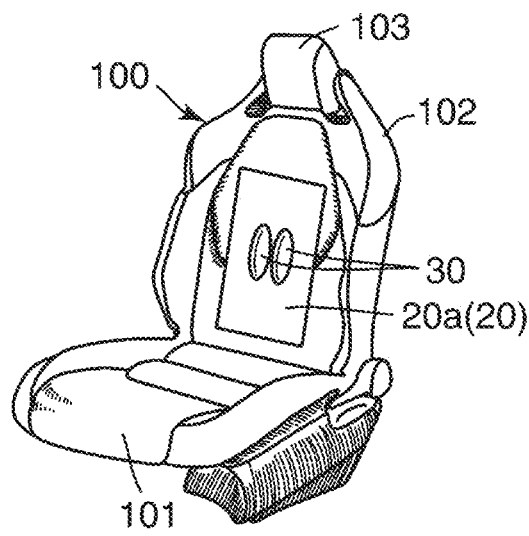
FIG. 7E is a perspective view illustrating an arrangement example of a support member in a posture support device according to a first embodiment of the present disclosure.

FIG. 7E shows a condition in which the support member 30 is set so as to be close to the left and right sides in order to deal with a case other than the case introduced in <Case 1>-<Case 4> described above.

Figure 7F:
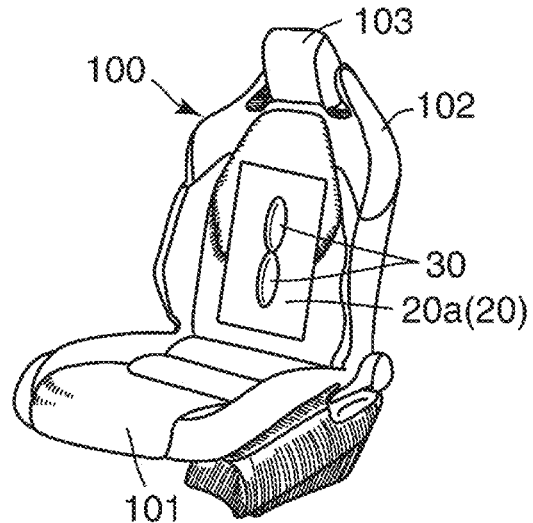
FIG. 7F is a perspective view illustrating an arrangement example of a support member in a posture support device according to a first embodiment of the present disclosure.

FIG. 7F shows a situation in which the support member 30 is set on the midline of the body in the attitude correspondence to correct the spine introduced in the above-described <Case 4>.

(B) In the use state, the fixing plate 20 is difficult to move in at least one of the upper, lower, left, right, front, and rear directions with respect to the seat back 102, so that it is possible to prevent the fixing plate 20 from being displaced with respect to the seat back 102 as compared with a case where it is relatively easily movable in all the directions of the upper, lower, left, right, front, and rear. Therefore, it is possible to prevent the support member 30 disposed on the fixing plate 20 from being displaced with respect to the seat back 102.

(C) In the use state, the fixing plate 20 is difficult to move in at least the downward direction with respect to the seat back 102, so that it is possible to prevent the fixing plate 20 from being displaced with respect to the seat back 102 in the downward direction, which is most likely to be displaced during use, as compared with the case where the fixing plate is relatively easily displaceable in the downward direction. Therefore, it is possible to prevent the support member 30 disposed on the fixing plate 20 from being displaced in the downward direction, which is most likely to be displaced in use, with respect to the seat back 102.

(D) As shown in FIGS. 10A to 10M, when all or a part of the at least one support member 30 is a first support member 30g having a general surface portion 32 and a protruding surface portion 33, the area of the contact portion between the support member 30 and the body of the seated person can be increased, the load per unit area is reduced, and the seated person can hardly feel a foreign body feeling or a sense of discomfort. (D1) to (D4) will be described in detail.

(D1) Around the spine of the human body is the erector spinae, the longest muscles, and the erector spinae, a group of muscles of the ribs. The erector spinae muscle is attached to the spinous process, which is a part of the vertebra constituting the spinal column, at the center, and has a structure protruding (bulging) to the back side of the spinous process. Therefore, as shown in FIG. 11, the back P5 of the human body has an uneven shape in which both sides thereof protrude rearward as compared with the central portion.

(D2) On the basis of this, if the support member 30 is constituted by a uniform flat surface, although there are differences depending on the hardness of the support member 30, the support member 30 cannot follow the shape with respect to the irregularities of the back P5 It will contact only with the convex surface of the back P5. Therefore, the area of the contact portion is reduced, the load of the contact portion is increased, and the seated person easily feels a foreign body feeling or a sense of discomfort.

(D3) In order to increase the area of the contact portion, there is a concept that the support member 30 is made of an extremely soft material, but in this case, since the body sinks into the support member 30, it is not suitable as a support function. In addition, since the density difference between the compressed and crushed support members 30 is also increased, this may also be one of the factors to feel uncomfortable. As the support member 30, an appropriate hardness for supporting the body is required, and it is preferable that a rough-and-dense difference at the time of support is also small.

(D4) In the present disclosure, all or a part of the at least one support member 30 is the first support member 30g having the general surface portion 32 and the protruding surface portion 33, and thus the protruding surface portion 33 is interposed in the recessed P5a in the back P5. Therefore, the area of the contact portion between the support member 30 and the body is increased, the load per unit area is reduced, and it is possible to make it difficult for the seated person to feel a foreign body feeling or a sense of discomfort.

(E) As shown in FIGS. 10F to 10M, when the amount of protrusion of the lower portion 34 of the first support member 30g toward the seated person is larger than that of the upper portion 35, the area of the contact portion between the support member 30 and the body of the seated person can be increased, the load per unit area is reduced, and the seated person can hardly feel a foreign body feeling or a sense of discomfort. (E1) to (E3) will be described in detail.

(E1) When the upper body of the human body is viewed from the side, the upper body is inclined downward and forward from the back to the waist. This is because the spinal column, which is the main skeleton constituting the human body, is inclined downward and forward, although there are differences among individuals, as shown in the reference P6 of FIG. 13A.

(E2) Therefore, by making the protruding amount of the lower portion 34 larger than the protruding amount of the upper portion 35, the first support member 30g can be applied to the body in a manner more suitable for the inclined spine.

(E3) Therefore, the area of the contact portion between the support member 30 and the body is increased, the load per unit area is reduced, and it is possible to make it difficult for the seated person to feel a foreign body feeling or a sense of discomfort.

Next, specific portions of the embodiments of the present disclosure will be described.

Example 1 (FIGS. 1 to 11)

In the first embodiment, the device 10 includes a device 10a, and the device 10a is as follows. As shown in FIG. 1, the fixing plate 20 is formed separately from the seat back 102 and includes a fixing plate 20a disposed on the front surface of the left and right central portions 102a of the seat back 102. The support member 30 is manually attachable to and detachable from the fixing plate 20a.

Figure 5A:
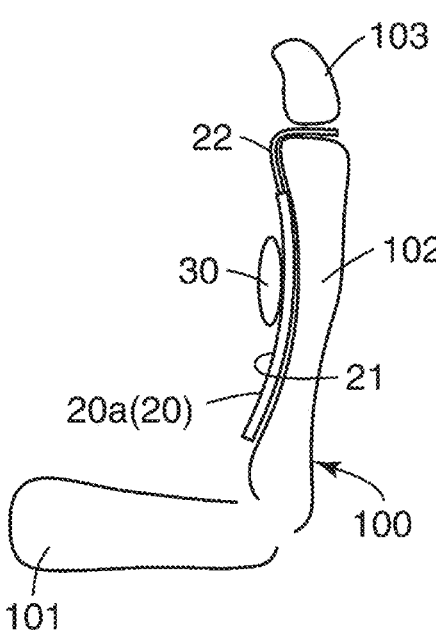
FIG. 5A is a schematic side view showing an arrangement example of the fixing plate to the seat back in the posture support device of the first embodiment.
Figure 5B:
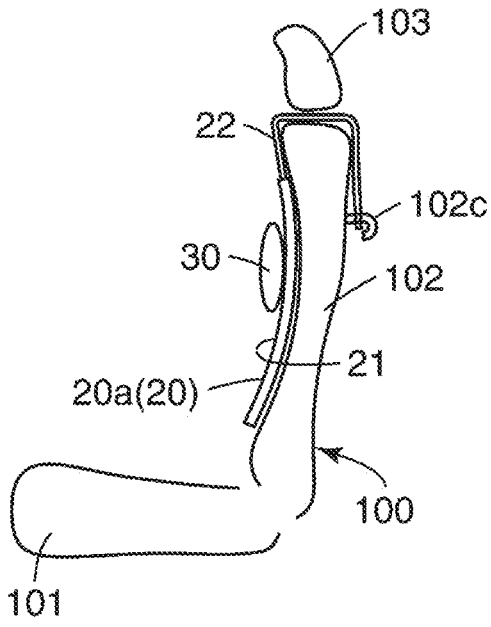
FIG. 5B is a schematic side view showing an arrangement example of the fixing plate to the seat back in the posture support device of the first embodiment.
Figure 5C:
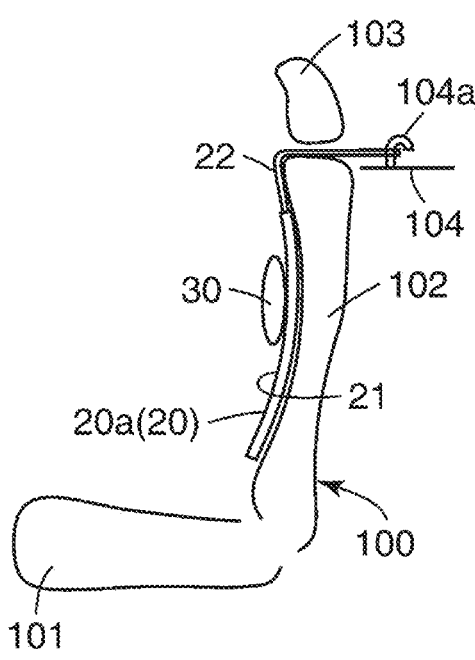
FIG. 5C is a schematic side view showing an arrangement example of the fixing plate to the seat back in the posture support device of the first embodiment.

As shown in FIGS. 5A to 5C, the fixing plate 20a is difficult to move downward at least with respect to the seat back 102 in the use condition. Incidentally, FIGS. 5A to 5C are difficult to move only downward, the upper, left, right, front, shows an embodiment which is relatively easily movable in the rear. FIG. 5A shows a case where a mounting member 22 made of a string, a band, a belt, or the like is provided on a fixing plate 20a, and the mounting member 22 is hooked on a headrest stay (not shown) provided on the seat 100, so that the fixing plate 20a is suspended from the headrest stay and is hardly displaced downward. FIG. 5B shows a case where the mounting member 22 is hooked on a hooking 102c provided on the rear surface of the seat back 102 so as to make the fixing plate 20a difficult to shift downward. FIG. 5C shows a case in which, when the seat 100 is a rear seat of the vehicle, the mounting member 22 is hooked on a hook 104*a* for a child seat set in the vehicle body 104 so as to make the fixing plate 20*a* difficult to shift downward.

Figure 6:
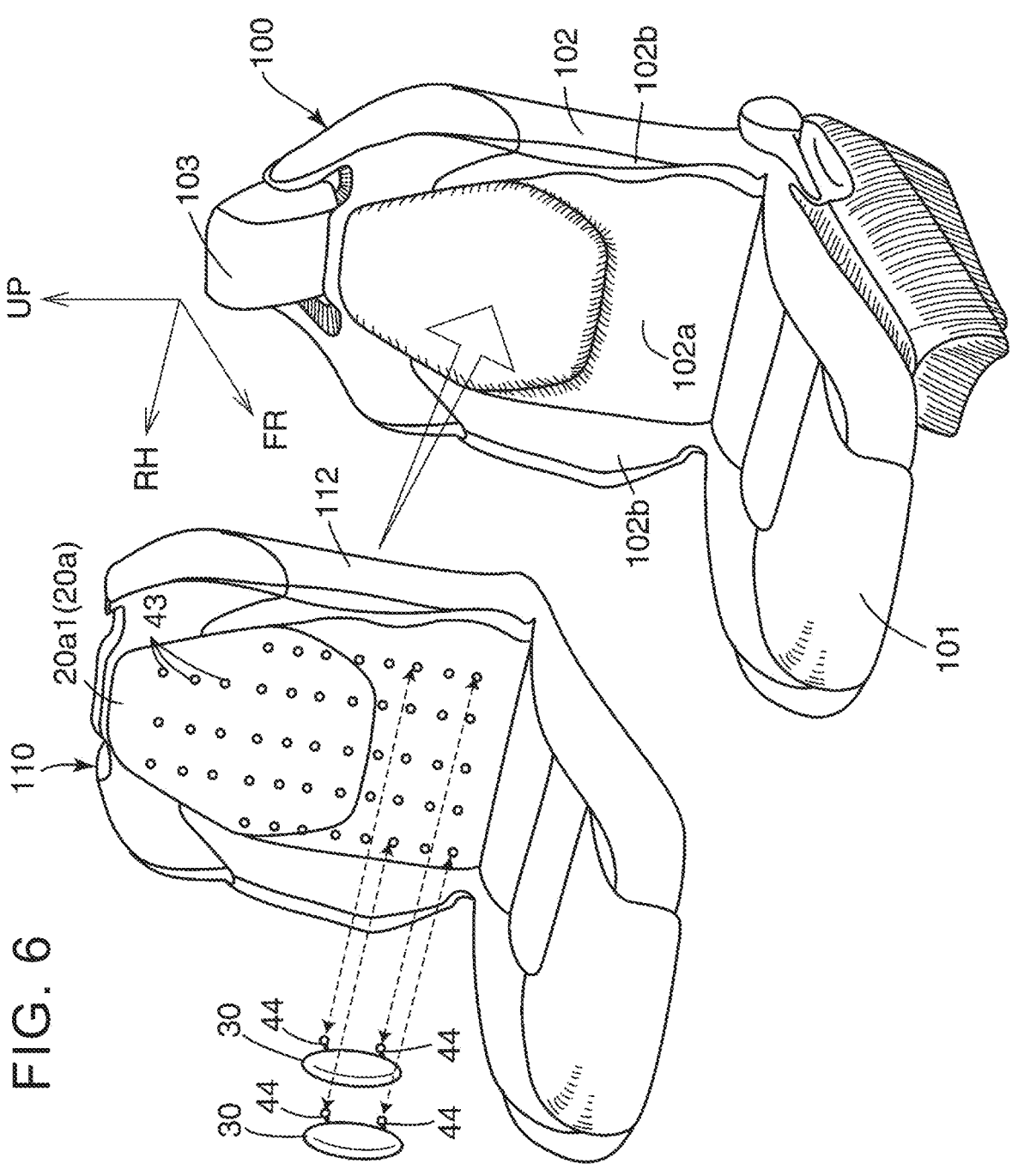
FIG. 6 is an exploded perspective view showing an example of arrangement of a fixing plate on a seat back in the posture support device according to the first embodiment of the present disclosure.

However, the fixing plate 20*a* may be difficult to move in a direction other than the downward direction with respect to the seat back 102 in the use state. FIG. 6 shows an example of a case where the fixing plate 20 is difficult to move in all directions of the upper, lower, left, right, front, and rear. FIG. 6 shows a fixing plate 20*a*1 that is separate from the seat 100 and integrated with the seat back portion 112 of the seat cover 110 attached to the seat 100. The seat cover 110 may be configured to cover only the seat back 102, or may be configured to cover up to the seat cushion 101. Note that, in FIG. 6, the attachment of the support member 30 to the fixing plate 20*a* is performed by the male and female structural portions 43 and 44 described later, but may be performed by the male and female fabrics 41 and 42 described later, or may be performed by other methods.

Attachment of the support member 30 to the fixing plate 20*a* is not particularly limited as long as the support member 30 is attachable to and detachable from the fixing plate 20*a* and the arrangement of the support member 30 with respect to the fixing plate 20*a* is variable. That is, as shown in FIG. 3, (a) Set up the male fabric 41 to at least a part of the front surface 21 of a fixing plate 20*a*, set up the female fabric 42 which can attach and detach to the male fabric 41 to the support member 30, and it may be performed using male and female fabrics like a hook-and-loop fastener, (b) As shown in FIG. 4, set up the concave female structural portion 43 by setting up a plurality of holes in at least a part of the front surface 21 of a fixing plate 20*a*, For example, set up a plurality of mushroom type protruding parts to the support member 30, set up the convex male structural portion 44 which can be fitted in the female structural portion 43, and it may be performed, and (c) illustration is not carried out, but a fixing plate 20*a* is made into a mesh shape, and the support member 30 may be fixed by a fastener such as a band. However, in the above (a), the female fabric 42 may be set on the front surface 21 of the fixing plate 20*a*, and the male fabric 41 may be set on the support member 30. In the above (b), the male structural portion 44 may be set on the front surface 21 of the fixing plate 20*a*, and the female structural portion 43 may be set on the support member 30.

Figure 8:
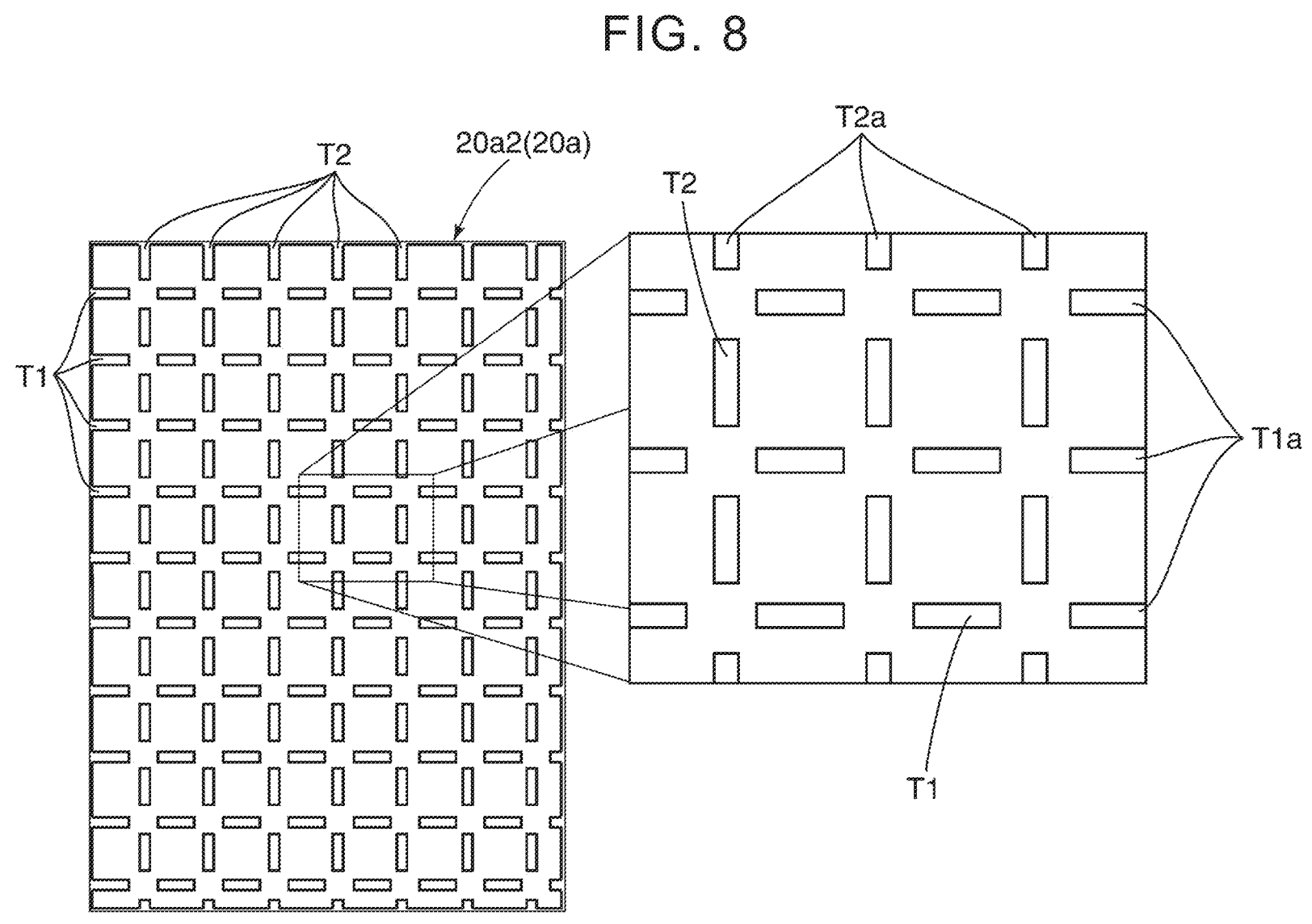
Figure 9:
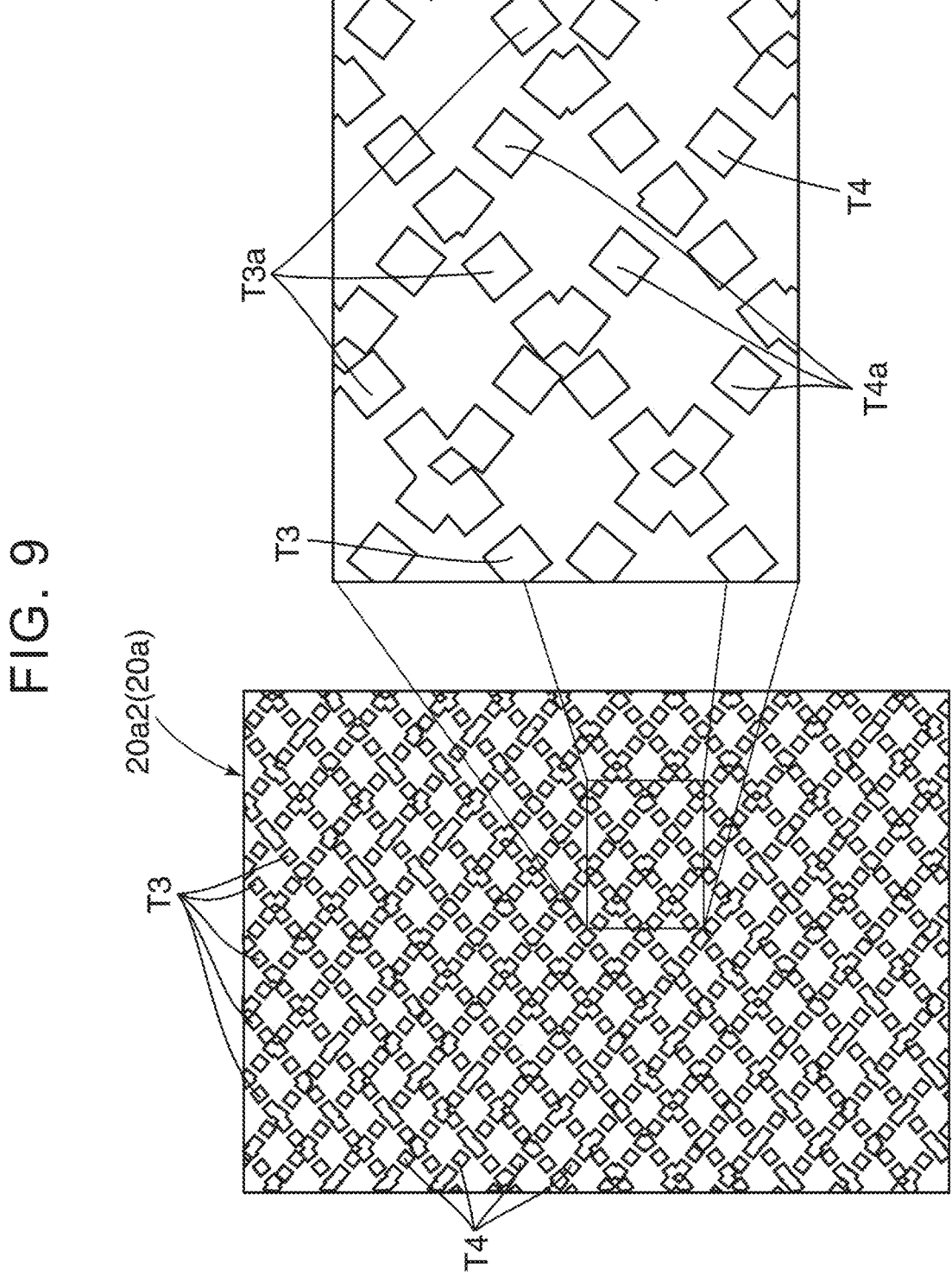
FIG. 9 is a front view and a partial enlarged view of a fixing plate in the posture support device of the first embodiment of the present disclosure, in a case where the fixing plate has a pattern in which the fixing plate is regularly arranged.

In addition, as shown in FIGS. 8 and 9, the fixing plate 20*a* is preferably a fixing plate 20*a*2 having a pattern regularly arranged on at least the front surface 21 in order to assist the arrangement of the support member 30. The reason for this will be described below.

For example, it is assumed that a fixing plate 20*a* is disposed in a driver's seat of a vehicle, and the device 10*a* is used by families. First, the husband uses the vehicle by arranging the support member 30 at a position suitable for his body. Thereafter, when the wife uses the vehicle, the wife may not fit the wife's body at the position of the husband's support member 30 due to a difference in height, a difference in pelvic width, or the like. Therefore, when the wife uses the vehicle, the support member 30 is disposed and used at a position suitable for the body of the wife. Thereafter, when the husband uses the vehicle again, the position suitable for the wife's body does not match the husband's body, and therefore it is necessary to return the support member 30 to the position suitable for the husband's body. At this time, if there is no mark or the like, it is necessary to reposition the support member 30 by searching for a position suitable for the user's body from the beginning again, and there is a possibility that the user feels uncomfortable.

In this case, the case of two persons, husband and wife, has been explained, but if two or more persons are used, the same applies to parents and children, siblings, parents and grandparents, etc. Further, although the driver's seat of the vehicle has been mentioned as an example, the same applies to a chair used in a passenger seat, a rear seat, a house, or the like of the vehicle.

Here, when the fixing plate 20*a* has a pattern that is regularly arranged, it is possible to easily reproduce the optimum arrangement of the support members 30 of individuals as compared with a case where the fixing plate 20*a* does not have a pattern that is regularly arranged. That is, even if the arrangement of the support member 30 is changed by another person by allowing the individual to remember a position suitable for the individual's body, the support member 30 can be relatively easily rearranged at a position suitable for the individual's body, and the accuracy of reproducibility is also improved.

Therefore, it is desirable that the fixing plate 20*a* is a fixing plate 20*a*2 having a pattern regularly arranged.

The regularly arranged patterns of the fixing plate 20*a*2 are constituted by, for example, straight lines, dots, holes, and the like. The regularly arranged pattern of the fixing plate 20*a*2, as shown in FIG. 8, in the front view of the fixing plate 20*a*2 (a1) lateral direction, i.e. horizontally extending horizontal lines, dots or holes, may have at least a pattern T1 regularly arranged so as to have a plurality of rows in the vertical direction, i.e. up and down direction, the pattern element T1*a* (a2) may have at least a pattern T2 regularly arranged so that a pattern element T2*a* such as a straight line, a dot or a hole provided on a vertical line extending in the vertical direction has a plurality of rows in the horizontal direction, and (a3) may have both a pattern T1 and a pattern T2. Note that FIG. 8 shows a case where both the pattern T1 and the pattern T2 are provided.

Further, the regularly arranged pattern of the fixing plate 20*a*2, as shown in FIG. 9, in the front view of the fixing plate 20*a*2, (a4) straight lines provided on an oblique line extending from the lower left to the upper right, dots or holes, the pattern element T3*a* may have a pattern T3 regularly arranged so as to have a plurality of rows from the lower right to the upper left, (a5) straight lines provided on an oblique line extending from the lower right to the upper left, dots or holes, may have at least a pattern T4 regularly arranged so that the pattern element T4*a* has a plurality of rows from the lower left to the upper right, and (a6) may have both the pattern T3 and the pattern T4. Note that FIG. 9 shows a case where both the pattern T3 and the pattern T4 are provided.

Further, although not shown, the regularly arranged pattern of the fixing plate 20*a*2 may have at least one of the pattern T1, T2 and at least one of the pattern T3,T4.

The regularly arranged patterns of the fixing plate 20*a*2 are provided by processing the base material of the fixing plate 20*a*2.

In the first embodiment of the present disclosure, since it has the above-described configuration, in addition to the functions and effects obtained in the common part over all the embodiments of the present disclosure, the following functions and effects can be obtained.

(F1) Since the fixing plate 20*a* is formed separately from the seat back 102 and is disposed on the front surface of the seat back 102, and the support member 30 is detachably attachable to the fixing plate 20*a*, the support member 30 can be relatively easily attached to any position of the front surface 21 of the fixing plate 20*a* at any desired angle.

(F2) A plurality of types of support members 30 having different amounts of projecting (bulging) in the forward direction from the fixing plate 20*a* are prepared, and by selectively using the plurality of types of support members 30, the position of the support member 30 can be adjusted not only in the vertical direction but also in the front-rear direction with respect to the seat back 102.

(F3) Since the fixing plate 20*a* is a fixing plate 20*a*2 having regularly arranged patterns, it is possible to easily reproduce the optimal arrangement of the support members 30 of individuals.

Example 2 (FIG. 12)

In the second embodiment, the device 10 is composed of a device 10*b*, and the device 10*b* is as follows. As shown in FIG. 12, the device 10*b* is disposed (included) inside the seat back 102. The fixing plate 20 is formed of a fixing plate 20*b* disposed inside the seat back 102. The support member 30 can be adjusted in position and angularity with respect to the fixing plate 20*b* by other methods such as electric power.

The fixing plate 20*b* is disposed at a front portion inside the seat back 102. The front portion of the inside of the seat back 102 is a front portion when the inside of the seat back 102 is divided into two equal parts in the thickness direction of the seat back 102. The support member 30 can be set not only in the up-down direction and the left-right direction but also in an arbitrary angle with respect to the fixing plate 20*b*, or can be adjusted in the front-rear direction.

In the second embodiment of the present disclosure, since it has the above-described configuration, in addition to the functions and effects obtained in the common part over all the embodiments of the present disclosure, the following functions and effects can be obtained.

(G1) Since the support member 30 is adjustable in position and angle with respect to the fixing plate 20*b* by electric power or the like, the posture support device 10*b* can be provided with a high-grade feeling as compared with a case where the position and angle of the support member 30 are manually adjustable with respect to the fixing plate 20*b*. (G2) Since the support member 30 can be set at an arbitrary angle not only in the vertical direction and the horizontal direction with respect to the fixing plate 20*b*, or the position can be adjusted in the front-rear direction, the support member 30 can be adjusted at an arbitrary angle not only in the vertical direction and the horizontal direction but also in the front-rear direction with respect to the seat back 102.

What is claimed is:

1. A posture support device for supporting a posture of a person seated in a seat, the posture support device comprising:

at least one fixing plate configured to be disposed on a front surface of a seat back of the seat or inside the seat back; and at least one support member disposed on the fixing plate, wherein the at least one support member is adjustably fixable onto a front surface of the fixing plate, the at least one support member includes a first support member, the first support member has, when the first support member is disposed on the fixing plate, a first portion, which has a flat surface portion and protrudes away from the fixing plate, and a second portion, which has a U-shaped cross section in a horizontal plane and protrudes away from the fixing plate more than the first portion.

2. The posture support device according to claim 1, wherein the fixing plate is configured to resist movement in at least one of an upward direction, a downward direction, a leftward direction, a rightward direction, a forward direction, and a rearward direction with respect to the seat back in a state in which the posture support device is used.

3. The posture support device according to claim 2, wherein the fixing plate is configured to resist movement in at least the downward direction with respect to the seat back in a state in which the posture support device is used.

4. The posture support device according to claim 1, wherein the second portion includes a protruding surface portion in at least a part of a central portion in a width direction of the first support member when the first support member is disposed on the fixing plate.

5. The posture support device according to claim 4, wherein:

the first support member includes, when the first support member is disposed on the fixing plate, a lower portion, and an upper portion above the lower portion; and the lower portion has a larger protrusion amount to a side where the person is seated in the seat than the upper portion.

6. The posture support device according to claim 1, wherein the first portion and the second portion of the first support member are detachably attachable to the fixing plate as a single piece.

7. The posture support device according to claim 6, wherein the fixing plate has a pattern regularly arranged at least on the front surface of the fixing plate.

8. The posture support device according to claim 7, wherein the pattern of the fixing plate has at least one of a pattern regularly arranged such that a pattern element provided on a horizontal line extending in a right-left direction has a plurality of rows in an up-down direction, and a pattern regularly arranged such that a pattern element provided on a vertical line extending in the up-down direction has a plurality of rows in the right-left direction, in a front view of the fixing plate.

9. The posture support device according to claim 8, wherein the first portion of the first support member has inclined surfaces extending toward each other in a direction toward the second portion of the first support member.

10. The posture support device according to claim 9, wherein the first portion of the first support member has inclined surfaces extending away from each other in a direction toward the second portion of the first support member.

11. The posture support device according to claim 10, wherein the at least one support member further includes a second support member, the second support member has, when the second support member is disposed on the fixing plate, a first portion, which has a flat surface portion and protrudes away from the fixing plate, and a second portion, which has a semicircular cross-sectional shape in the horizontal plane and protrudes away from the fixing plate more than the first portion of the second support member, the second portion of the second support member is provided in at least a part of a central portion in a width direction of the second support member, and the first and second portions of the second support member are detachably attachable to the fixing plate as a single piece.

12. The posture support device according to claim 11, wherein the at least one support member further includes a third support member, the third support member has, when the third support member is disposed on the fixing plate, a first portion, which is tapered and protrudes away from the fixing plate, and a second portion, which has a flat surface and protrudes away from the fixing plate more than the first portion of the third support member, the second portion of the third support member is provided in at least a part of a central portion in a width direction of the third support member, and the first and second portions of the third support member are detachably attachable to the fixing plate as a single piece.

13. The posture support device according to claim 12, wherein the at least one support member further includes a fourth support member, the fourth support member has, when the fourth support member is disposed on the fixing plate, an upper portion protruding away from the fixing plate, and a lower portion protruding away from the fixing plate more than the upper portion, and the first and second portions of the fourth support member are detachably attachable to the fixing plate as a single piece.

14. The posture support device according to claim 13, wherein the lower portion of the fourth support member has a U-shaped cross section in the horizontal plane when the fourth support member is disposed on the fixing plate.

15. The posture support device according to claim 13, wherein the lower portion of the fourth support member has a semicircular cross-sectional shape in the horizontal plane when the fourth support member is disposed on the fixing plate.

16. The posture support device according to claim 13, wherein the upper portion of the fourth support member has a sloped protruding surface portion and two inclined surfaces extending toward each other in a direction toward the protruding surface portion, and the lower portion of the fourth support member has a flat protruding surface portion continuous with the sloped protruding surface portion.

17. The posture support device according to claim 13, wherein the upper portion of the fourth support member has a constant protrusion amount, and the lower portion of the fourth support member has a flat protruding surface portion and two inclined surfaces extending toward each other in a direction toward the flat protruding surface portion.

18. The posture support device according to claim 13, wherein the fourth support member further includes a protrusion portion protruding from the lower portion away from the fixing plate when the fourth support member is disposed on the fixing plate.

19. The posture support device according to claim 18, wherein the protrusion portion of the fourth support member protrudes from the lower portion by a protruding amount that decreases toward a bottom of the lower portion.

20. The posture support device according to claim 18, wherein the protrusion portion of the fourth support member protrudes from the lower portion by a protruding amount that increases toward a bottom of the lower portion.

* * * * *